United States Patent
Patton et al.

(10) Patent No.: US 9,486,817 B2
(45) Date of Patent: Nov. 8, 2016

(54) OZONE SHOWER DEVICE

(71) Applicant: Delta Faucet Company, Indianapolis, IN (US)

(72) Inventors: Paul V. Patton, Indianapolis, IN (US); Thomas F. Foust, Carmel, IN (US); Robert W. Rodenbeck, Indianapolis, IN (US); Patrick B. Jonte, Zionsville, IN (US)

(73) Assignee: Delta Faucet Company, Indianapolis, IN (US)

( * ) Notice: Subject to any disclaimer, the term of this patent is extended or adjusted under 35 U.S.C. 154(b) by 65 days.

(21) Appl. No.: 14/191,790

(22) Filed: Feb. 27, 2014

(65) Prior Publication Data

US 2014/0263689 A1    Sep. 18, 2014

Related U.S. Application Data

(60) Provisional application No. 61/791,336, filed on Mar. 15, 2013.

(51) Int. Cl.
*C02F 1/30* (2006.01)
*C02F 1/78* (2006.01)
(Continued)

(52) U.S. Cl.
CPC ............... *B05B 1/18* (2013.01); *B05B 12/085* (2013.01); *B05B 12/10* (2013.01);
(Continued)

(58) Field of Classification Search
CPC ......... B01D 17/12; B01D 35/02; C02F 1/30; C02F 1/46; C02F 1/4606; C02F 1/467; C02F 1/4672; C02F 1/50; C02F 1/505; C02F 1/78; C02F 2201/4611; C02F 2201/46145; C02F 2201/4615; C02F 2201/78; C02F 2201/782; C02F 2209/02; C02F 2209/23; C02F 2209/40; C02F 2209/44; A47K 3/28; A47K 3/281; B05B 1/16; B05B 1/18; B05B 12/02; B05B 12/08; B05B 12/085; B05B 12/10; B05B 12/1436
USPC ............ 4/596, 597; 137/544, 551, 553, 603, 137/801; 210/85, 87, 91, 94, 97, 138, 139, 210/141, 143, 192, 449, 748.19, 760; 239/1, 589; 422/186.07, 186.08, 186.1, 422/186.14, 28
See application file for complete search history.

(56) References Cited

U.S. PATENT DOCUMENTS 5,206,963 A * 5/1993 Wiens ................... E03C 1/00
                                                            4/597
5,653,868 A * 8/1997 Yanou .................. B01D 35/043
                                                            210/232

(Continued)

FOREIGN PATENT DOCUMENTS

| CN | 101509576 A | 8/2009 |
| JP | 2005169297 A | 6/2005 |
| KR | 20090086962 A | 8/2009 |

OTHER PUBLICATIONS

Ozone Generator, www.alibaba.com.

(Continued)

*Primary Examiner* — Joseph Drodge
(74) *Attorney, Agent, or Firm* — Faegre Baker Daniels, LLP

(57) ABSTRACT

A fluid delivery assembly for a shower includes a waterway assembly, a spray head, and a water treatment assembly. The spray head is configured to receive fluid from the waterway assembly and deliver fluid from an outlet. The water treatment assembly is configured to provide a treatment to the fluid of the waterway assembly.

7 Claims, 4 Drawing Sheets

(51) Int. Cl.
  *B05B 1/16* (2006.01)
  *B05B 1/18* (2006.01)
  *B05B 12/08* (2006.01)
  *B05B 12/10* (2006.01)
  *B05B 12/14* (2006.01)

(52) U.S. Cl.
  CPC ............ *B05B 12/1436* (2013.01); *C02F 1/30* (2013.01); *C02F 1/78* (2013.01); *B05B 1/16* (2013.01); *C02F 2201/78* (2013.01); *C02F 2209/02* (2013.01); *C02F 2209/23* (2013.01); *C02F 2209/44* (2013.01)

(56) References Cited

U.S. PATENT DOCUMENTS

| | | | |
|---|---|---|---|
| 6,135,146 A * | 10/2000 | Koganezawa | A61L 2/202 137/551 |
| 6,673,248 B2 | 1/2004 | Chowdhury | |
| 6,723,233 B1 | 4/2004 | Barnes | |
| 6,797,156 B2 | 9/2004 | Chau | |
| 7,768,146 B2 | 8/2010 | Balzano | |
| 7,875,173 B1 | 1/2011 | Barnes | |
| 7,931,813 B2 | 4/2011 | Asokan et al. | |
| 7,932,618 B2 | 4/2011 | Baarman et al. | |
| 7,956,480 B2 | 6/2011 | Onodera et al. | |
| 7,956,481 B2 | 6/2011 | Baarman et al. | |
| 8,099,802 B2 | 1/2012 | Yamaguchi et al. | |
| 8,152,142 B2 | 4/2012 | Hirakui | |
| 2003/0000896 A1* | 1/2003 | Chowdhury | B01F 3/0446 210/739 |
| 2005/0205475 A1* | 9/2005 | Hsu | B01D 35/04 210/85 |
| 2006/0053546 A1 | 3/2006 | Gloodt | |
| 2006/0283973 A1* | 12/2006 | Bean | B05B 1/185 239/70 |
| 2008/0035580 A1 | 2/2008 | de Rijk | |
| 2009/0218285 A1* | 9/2009 | Hank | B01D 61/12 210/650 |
| 2010/0089765 A1* | 4/2010 | Arihara | C01B 13/11 205/626 |
| 2011/0175351 A1 | 7/2011 | Baarman et al. | |
| 2011/0256027 A1 | 10/2011 | Chen et al. | |
| 2012/0006729 A1* | 1/2012 | Hatakeyama | C02F 1/003 210/85 |
| 2013/0177475 A1* | 7/2013 | Finch | A01N 33/04 422/28 |
| 2013/0212800 A1* | 8/2013 | Kaler | E03B 1/041 4/597 |

OTHER PUBLICATIONS

Ozone Boy, www.cleanwaterstore.com/OS001630-p-ozone-faucet/html.

* cited by examiner

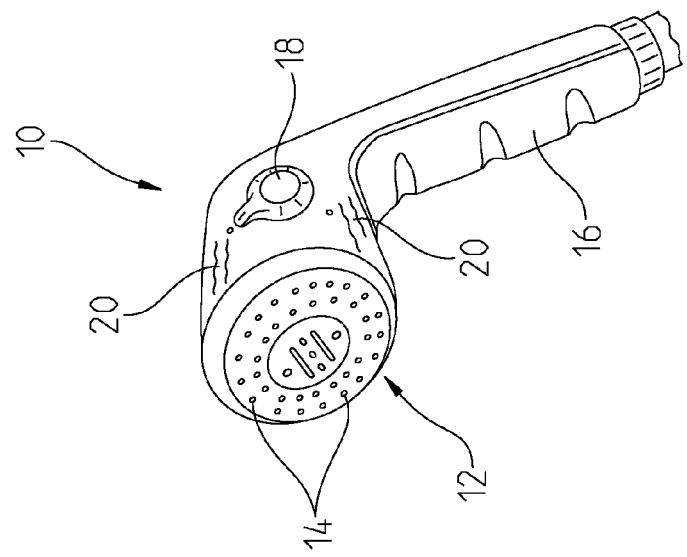
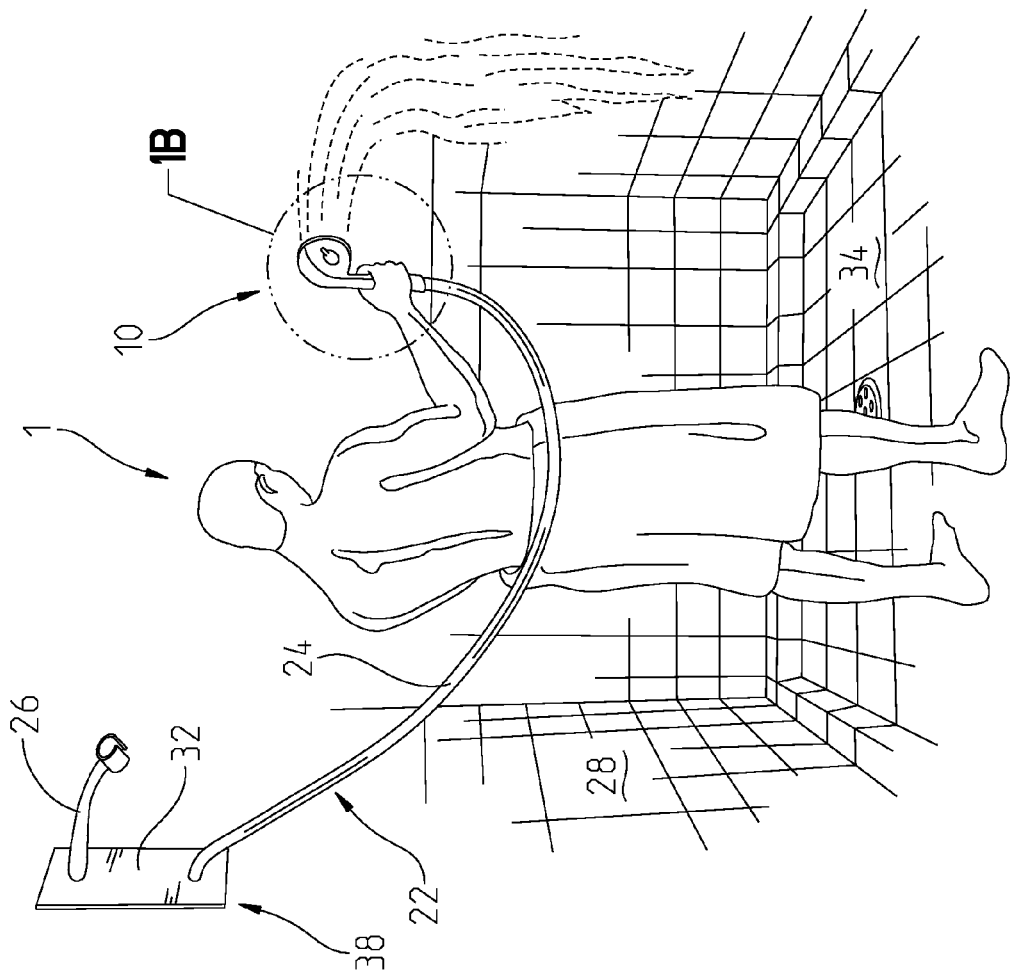
Fig. 1B
Fig. 1A

OZONE SHOWER DEVICE

CROSS-REFERENCE TO RELATED APPLICATIONS

The present application claims priority to U.S. Provisional Patent Application Ser. No. 61/791,336, filed on Mar. 15, 2013 and entitled "OZONE SHOWER DEVICE," the complete disclosure of which is expressly incorporated by reference herein.

BACKGROUND AND SUMMARY OF THE INVENTION

The present invention relates generally to a fluid delivery device for a shower having a fluid treatment assembly and, more particularly, to a spray head for a shower configured to output ozonated water.

Fluid delivery devices, such as showers or faucets, may include a fluid treatment device. For example, a treatment device may include a filter or a water softener configured to treat the water before it flows from the fluid delivery device. A user input may be provided for controlled use of the fluid treatment device.

An illustrative embodiment of the present disclosure includes a fluid delivery assembly for a shower comprising a waterway assembly, a spray head, and a water treatment assembly. The spray head is configured to receive fluid from the waterway assembly and deliver fluid from an outlet. The water treatment assembly is configured to provide a treatment to the fluid of the waterway assembly to decrease at least one of bacteria, mold, germs, and viruses within the spray head.

In another illustrative embodiment of the present disclosure, a fluid delivery device comprises a waterway assembly, a spray head fluidly coupled to the waterway assembly, and a water treatment assembly positioned within the waterway assembly. Additionally, the fluid delivery device comprises a sensor positioned within the waterway assembly. The sensor is configured to detect a flow of fluid. The fluid delivery device also comprises a controller, which is in electrical communication with the sensor and is configured to provide an electrical signal to the water treatment assembly to output a treatment into the waterway. The treatment is provided to the spray head for cleaning the spray head.

In a further illustrative embodiment of the present disclosure, a method of operating a fluid delivery assembly with a water treatment assembly comprises the steps of providing at least one spray head configured to operate in at least one of a showering mode and a water treatment mode, and initiating a flow of water from the spray head. Additionally, the method comprises the step of activating the water treatment assembly when the spray head is in the water treatment mode. The method also comprises the step of providing a controller configured to regulate the flow of water from the spray head according to at least one of a water treatment concentration, a water temperature, and an operating time of the water treatment assembly.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying Figures in which:

FIG. 1A is a perspective view of an illustrative embodiment spray head for a shower enclosure of the present disclosure, with the spray head positioned within the shower enclosure;

FIG. 1B is front perspective view of the spray head of FIG. 1A;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention. Although the disclosure is described in connection with water, it should be understood that additional types of fluids may be used.

Figure 2:
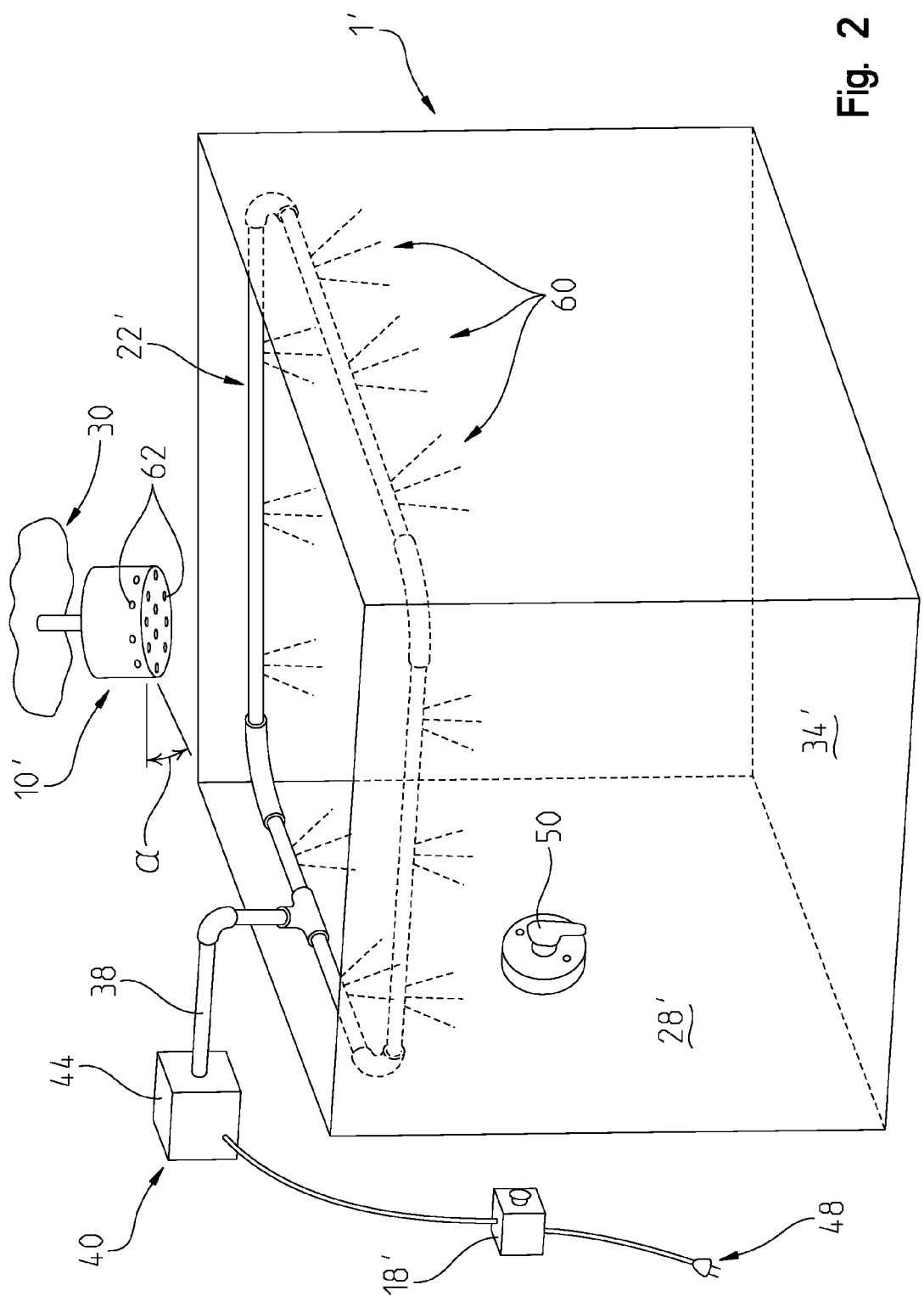
FIG. 2 is a further illustrative embodiment shower spray head within an alternative shower enclosure of the present disclosure.

Referring to FIGS. 1A and 1B, an illustrative embodiment spray head 10 for a shower enclosure 1 is shown including a nozzle or outlet 12 having a plurality of openings 14, a handle 16, and a user input device 18 for toggling or switching between a plurality of modes 20. Spray head 10 is fluidly coupled to a waterway assembly 22, which may include a flexible hose 24. Illustratively, spray head 10 is a hand-held sprayer and may be coupled to a support stand 26 coupled to a wall 28 of shower enclosure 1. In one embodiment, an alternative embodiment spray head 10' may be coupled to a ceiling 30 of an alternative embodiment shower enclosure 1' (FIG. 2). An escutcheon 32 may be coupled to wall 28 or ceiling 30.

In operation, spray head 10 receives water from a water supply 38 and outputs the water through outlet 12. Openings 14 on outlet 12 may be adjusted to provide a plurality of flow patterns. Additionally, spray head 10 may be configured to operate in a plurality of modes 20. For example, spray head 10 may be configured in a normal or showering spray mode in which the water from spray head 10 is intentionally directed toward the user for regular showering. In the showering mode, the water from spray head 10 may not contain a water treatment. Alternatively, spray head 10 may be selectively configured in a water treatment mode, for example a cleaning or ozone mode, in which the water from spray head 10 may contain a water treatment and is intentionally directed toward shower enclosure 1 rather than the user, as detailed further herein.

When spray head 10 is turned off, residual water may remain therein. Standing water in spray head 10 may contribute to the presence of bacteria, mold, viruses, or germs within spray head 10. Additionally, germs, bacteria, mold, and/or viruses may be present in shower enclosure 1, for example, on walls 28, ceiling 30, and/or a floor 34. A water treatment assembly 40 (FIGS. 2 and 3) may be operably coupled to spray head 10 and configured to decrease or eliminate the presence of bacteria, germs, mold, and/or viruses in spray head 10 and/or shower enclosure 1.

Figure 3:
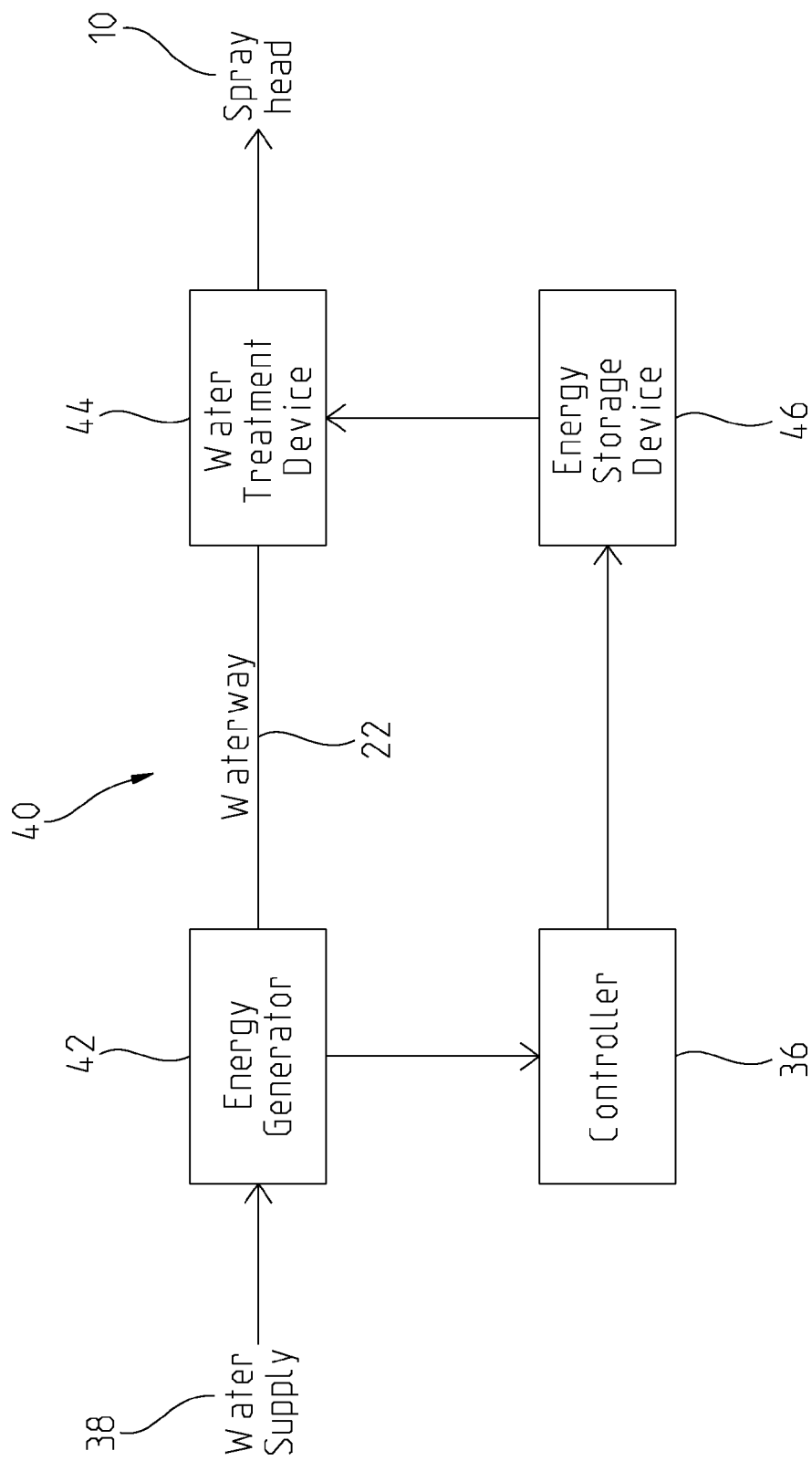
FIG. 3 is a diagrammatic view of the present disclosure, illustrating a water flow path and an electrical flow path.

As shown in FIG. 3, water treatment assembly 40 may include an energy generator 42, a water treatment device 44, a controller 36, and an energy storage device 46. Water treatment assembly 40 may further include user input device 18 which, as shown in FIG. 1, may be a rotatable knob or dial on spray head 10. Alternatively, as shown in FIG. 2, an alternative user input device 18' may be a button or knob adjacent shower enclosure 1'. In other embodiments, user input device 18 may be a sensor, lever, or other activation device. As shown in FIG. 2, water treatment assembly 40 may be hard-wired to a power system 48 for operation. Another embodiment of water treatment assembly 40 may be wirelessly or remotely coupled to power system 48 for operation.

Energy generator 42 of water treatment assembly 40 is illustratively positioned within the flow path of the water through waterway assembly 22. In one embodiment, energy generator 42 is positioned upstream of spray head 10 such that energy generator 42 may be within water supply 38 or hose 24. Illustrative energy generator 42 may be a hydroelectric generator and, as such, generates energy from the flow of water in waterway 22. Energy generator 42 may be operably coupled to energy storage device 46, which accumulates and stores the energy generated by energy generator 42.

Exemplary energy storage device 46 may be a rechargeable battery or capacitor (e.g., a super capacitor). Energy storage device 46 may have an operating life of at least approximately two years and is configured to store a full charge of energy for at least approximately two days. During operation of spray head 10, when the water in waterway assembly 22 has a flow rate of approximately 1.5 gallons/minute and a pressure of approximately 20 psi, energy generator 42 may be configured to generate a sufficient amount of energy to fully recharge energy storage device 46 in approximately 10 minutes.

Water treatment device 44 of water treatment assembly 40 is positioned within waterway assembly 22 and is operably coupled to energy storage device 46 to receive energy therefrom. Illustratively, water treatment device 44 may be an ozone generator. Exemplary water treatment device 44 may be configured to generate a concentration of ozone to substantially decrease or eliminate the bacteria, mold, viruses, or germs within spray head 10 after approximately 1-5 seconds of operation. Waterway assembly 22, spray head 10, and any housing or discharge unit for water treatment device 44 are comprised of materials configured to withstand the presence and potential corrosive properties of the ozone generated by water treatment device 44.

Figure 4:
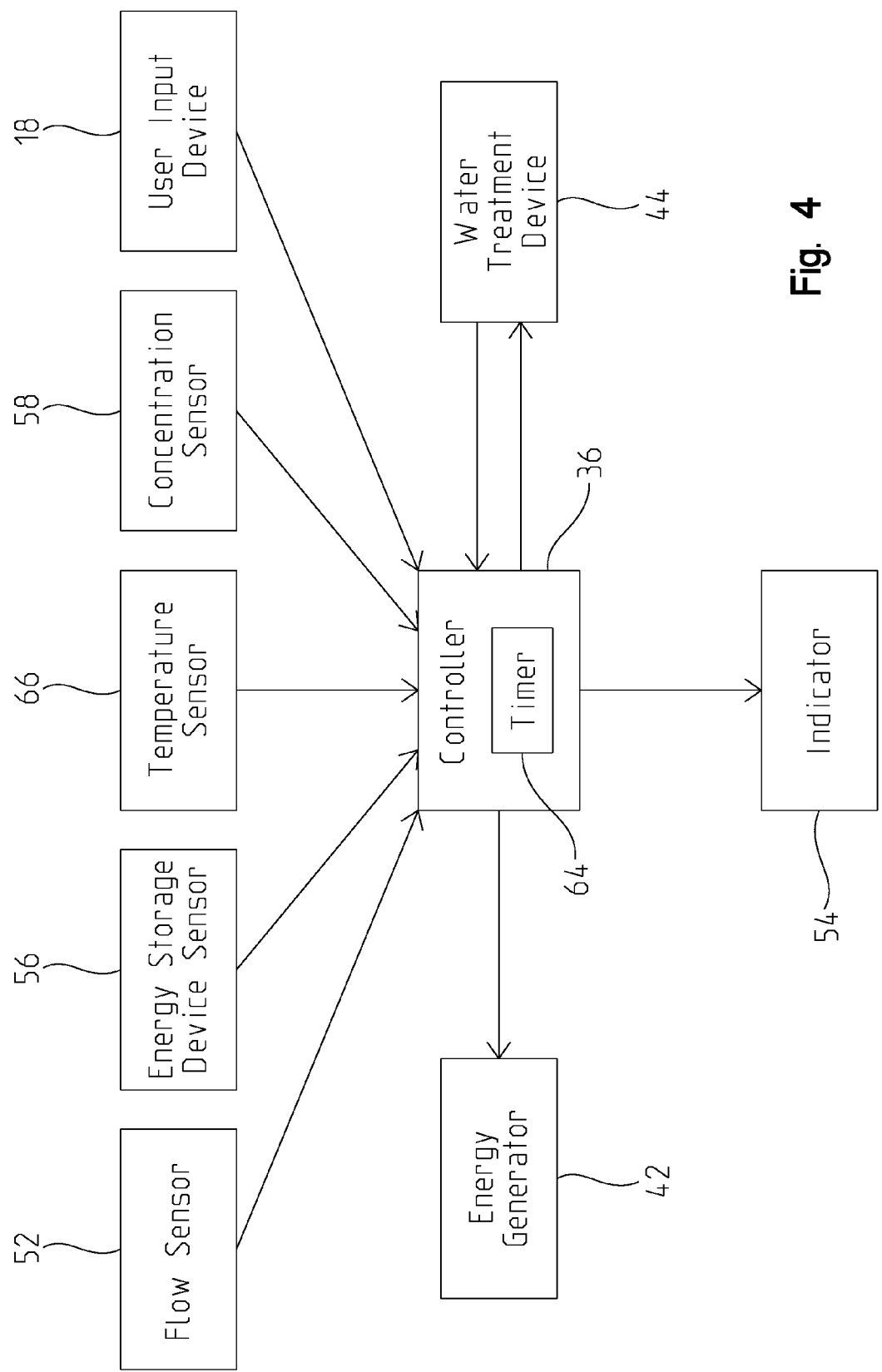
FIG. 4 is a diagrammatic view of the present disclosure, illustrating a plurality of inputs and outputs.

Referring to FIG. 4, water treatment assembly 40 also may include a flow sensor 52 operably coupled to controller 36. Flow sensor 52 may be positioned within waterway assembly 22 and is configured to detect the flow of water therein. Additionally, flow sensor 52 may be configured to indicate the flow rate and/or other properties of the water in waterway assembly 22 to controller 36.

Water treatment assembly 40 also may include an indicator 54 operably coupled to controller 36. Indicator 54 may be a light, sound, vibration, or other signal that indicates a mode or a property of spray head 10 to a user. For example, indicator 54 may be an LED light configured to illuminate, flash, or otherwise indicate the current mode of spray head 10 and/or a warning or alert to the user. In one embodiment, indicator 54 is an LED configured to illuminate when controller 36 sends a signal indicating that spray head 10 is in the cleaning mode and water treatment device 44 is operating.

Additionally, water treatment assembly 40 may include a sensor 56 operably coupled to energy storage device 46. Energy storage device sensor 56 may be configured to detect the properties of energy storage device and send a signal to controller 36 to indicate properties thereof, such as the current charge capacity of energy storage device 46, the remaining operating life of energy storage device 46, and/or that a malfunction has occurred within energy storage device 46.

As shown in FIG. 4, water treatment assembly 40 also may include a concentration sensor 58. Concentration sensor 58 may be positioned within waterway assembly 22 downstream of water treatment device 44 and is configured to detect the concentration of the water treatment within the water in waterway assembly 22. For example, concentration sensor 58 may be configured to detect the concentration of ozone within the water in waterway assembly 22. Alternatively, concentration sensor 58 may be configured to detect other properties of the water in waterway assembly 22, for example the concentration of particulate matter, bacteria, or pH. If controller 36 receives a signal from concentration sensor 58 that the water treatment concentration is greater than a predetermined maximum value, controller 36 may send a signal to turn off water treatment device 44.

Additionally, water treatment assembly 40 may include a temperature sensor 66 (FIG. 4) and may be positioned within waterway 22 and configured to send a signal to controller 36 indicative of the water temperature. Controller 36 may control operation of water treatment device 44 based on the temperature of the water. In one embodiment, if temperature sensor 66 indicates to controller 36 that the temperature of the water within waterway 22 is greater than a predetermined maximum, controller 36 may prevent water treatment device 44 from operating. For example, if water treatment device 44 is configured to output an ozone treatment into the water in waterway 22, controller 36 may prevent water treatment device 44 from operating when the temperature of the water is greater than a predetermined maximum temperature in order to minimize off-gassing.

Spray head 10 and exemplary water treatment assembly 40 may be configured to operate in a plurality of modes 20. For example, spray head 10 may operate in the showering mode, in which water treatment assembly 40 is not operating. As such, water in waterway 22 may flow past water treatment device 44 without receiving a treatment. In this way, a user is not exposed to the water treatment during regular showering. In one embodiment, energy generator 42 generates energy from the water even when water treatment device 44 is not operating in order to maintain a full or complete charge within energy storage device 46. Alternatively, energy generator 42 may not operate when water treatment device 44 is not operating.

In another mode, for example the water treatment mode, the user may activate water treatment assembly 40 through user input device 18 in order to output a treatment (e.g., ozone) into the water in waterway 22. In operation, water treatment assembly 40 operates when a user activates user input device 18, for example, by turning a dial on user input device 18 in FIG. 1, pressing a button or knob on user input device 18' in FIG. 2, actuating a sensor (e.g., a proximity sensor, such as a capacitive sensor), or flipping a switch. Controller 36 then receives a signal from user input device 18 to initiate a water treatment, for example an ozone treatment, into the water flowing from spray head 10. Controller 36 may send a signal to initiate the flow of water from water supply 38, or alternatively, a user may manually initiate the flow of water from water supply 38 by activating a valve assembly 50 (FIG. 2). As the water flows through waterway assembly 22, the water flows past flow sensor 52. Flow sensor 52 may send a signal to controller 36 to indicate that water is flowing in waterway assembly 22. When controller 36 receives the signal from flow sensor 52 that water is flowing in waterway assembly 22, controller 36 may actuate water treatment device 44 to output a treatment into the water in waterway assembly 22. Illustratively, water treatment device 44 receives power from energy storage device 46 and outputs ozone into the water. As such, illustrative water treatment device 44 may decrease the level of bacteria, mold, germs, and/or viruses within spray head 10 and/or shower enclosure 1.

Additionally, as shown in FIG. 3, as the water flows through waterway assembly 22, the water flows past energy generator 42, which uses the flow of water to generate energy for replenishing the energy in energy storage device 46. More particularly, because energy storage device 46 supplies energy to water treatment device 44 when spray head 10 is in the water treatment mode, the energy in energy storage device 46 decreases. However, when water treatment assembly 40 is activated, energy generator 42 uses the flow of water in waterway assembly 22 to replenish the energy within energy storage device 46.

When water treatment device 44 is operating, controller 36 may send a signal to indicator 54 to alert the user that spray head 10 is in the water treatment mode. As such, the user understands that the treated water flow from spray head 10 should be directed to shower enclosure 1, rather than toward the user, in order to limit the user's exposure to the water treatment (e.g., ozonated water). In embodiment, shower enclosure 1 and/or spray head 10 may be configured with a user detection sensor (not shown) which may detect the presence of a user in the path of the treated water. For example, if an ozonated water flow is directed toward a user, the user detection sensor may send a signal to controller 36. Controller 36 then may send a signal to indicator 54 to alert the user to direct the ozonated water toward shower enclosure 1. Alternatively, controller 36 may send a signal to turn off water treatment device 44 such that the water flow from spray head 10 is no longer treated.

Additionally, when water treatment device 44 is operating, controller 36 may be configured to receive a signal from energy storage device sensor 56 to indicate the conditions of energy storage device 44 (e.g., the storage capacity). Controller 36 also may receive a signal from concentration sensor 58 to indicate the concentration of the water treatment within the water in waterway 22. Controller 36 also may receive a signal from water treatment device 44 indicative of the conditions of water treatment device 44 (e.g., limited operating life, a malfunction).

Water treatment assembly 40 may be turned off by controller 36 after a predetermined length of time of operation. Alternatively, water treatment 40 may be turned off when a user manually turns off the water flow to spray head 10 (e.g., manually closes valve 50 (FIG. 2)).

When water treatment assembly 40 is operating as detailed herein, a user also may be able to indicate a specific type of water treatment. More particularly, water treatment assembly 40 may be configured to output a water treatment for spray head 10 (i.e., a spray head water treatment mode) and a water treatment for shower enclosure 1 (i.e., a shower enclosure water treatment mode). When a user activates the spray head water treatment mode, water treatment device 10 is configured to output a short-duration, high-concentration output of water treatment in spray head 10 in order to decrease the amount of any bacteria, mold, germs, and/or viruses within spray head 10 that may be caused by residual water left standing in spray head 10 after a previous use. For example, when water treatment assembly 40 is in the spray head water treatment mode, water treatment device 44 may operate for a predetermined amount of time to output a predetermined concentration of ozone into the water in waterway 22 and/or spray head 10 in order to decrease the amount of any bacteria, mold, germs, and/or viruses within spray head 10. In one embodiment, water treatment device 44 may be configured to operate for approximately 1-10 seconds, and more particularly, approximately 1-5 seconds, to output a concentration of ozone sufficient to generally eliminate bacteria, viruses, mold, and/or germs from spray head 10.

Controller 36 may include a timer 64 (FIG. 4) for determining the length of time water treatment device 44 is operating. As such, when in the spray head water treatment mode, controller 36 may automatically turn off water treatment device 44 after water treatment device 44 has been operating for the predetermined length of time. Alternatively, controller 36 may send a signal to indicator 54 to output an indication (e.g., a different LED light color, a flashing light, and/or a sound or vibration) to the user signaling that the spray head water treatment is complete.

Alternatively, when a user indicates that spray head 10 should be in the shower enclosure water treatment mode, water treatment assembly 40 is configured to output a longer-duration, lower-concentration output of water treatment from spray head 10 in order to decrease the amount of any bacteria, mold, germs, and/or viruses on walls 28, ceiling 30, and/or floor 34 of shower enclosure 1. For example, a user may direct the water flow from spray head 10 toward walls 28, ceiling 30, and/or floor 34 of shower enclosure 1 in order to output ozonated water onto shower enclosure 1. When in the shower enclosure water treatment mode, water treatment assembly 40 may be configured to operate indefinitely while a user directs the treated water flow (e.g., ozonated water flow) toward shower enclosure 1. In an alternative embodiment, controller 36 may turn off water treatment device 44, or indicate to the user that water treatment device 44 should be turned off, after a predetermined length of time (e.g., 10 minutes). The concentration of ozone outputted from spray head 10 in the shower enclosure water treatment mode may be less than the concentration of ozone outputted in the spray head water treatment mode in order to limit the user's exposure to the ozone.

In one embodiment, spray head 10 is a hand-held shower sprayer and a user is able to manually direct the flow of treated water toward specific locations of shower enclosure 1. Alternatively, as shown in FIG. 2, spray head 10' may be fixed to a surface of shower enclosure 1', for example ceiling 30. As such, the user does not manually direct the flow of treated water towards a specific location of shower enclosure 1'. Rather, spray head 10' is configured with a plurality of openings 62 to output water from spray head 10'. When outputting water from spray head 10', water may flow outwardly from openings 62 in order to direct water toward each wall 28', floor 34', and/or ceiling 30 of shower enclosure 1'. In one embodiment, spray head 10' may be configured to direct water toward walls 28' at an angle $\alpha$ from spray head 10'. Angle $\alpha$ may be up to approximately 70°. In this way, when a user activates water treatment assembly 40 in the shower enclosure water treatment mode, spray head 10' outputs treated water (e.g., ozonated water) to walls 28' and floor 34' of shower enclosure 1'. Spray head 10' may be configured to move in a vertical direction and/or rotate in order to output water to various portions of walls 28' and floor 34'.

As shown in FIG. 2, user input device 18' of shower enclosure 1' may be positioned outside of shower enclosure 1' such that a user activates water treatment assembly 40 from outside of shower enclosure 1'. In this way, the user's exposure to the water treatment may be limited because the user is not within shower enclosure 1' during the water treatment. Additionally, shower enclosure 1' may include the user detection sensor which may send a signal to controller 36 if a user is detected within shower enclosure 1' during operation of water treatment assembly 40. If controller 36 receives a signal from the user detection sensor, controller 36 may be configured to stop operation of water treatment assembly 40 in order to limit the user's exposure to the water treatment, or alternatively, may be configured to signal indicator 54 to output a light, sound, or vibration alerting the user to leave shower enclosure 1' during operation of water treatment assembly 40.

Additionally, as shown in FIG. 2, a waterway 22' of shower enclosure 1' may be coupled to walls 28' such that waterway 22' generally extends around the inner perimeter of shower enclosure 1'. Waterway 22' may be configured with a plurality of outlets 60 in order to output water along each wall 28' of shower enclosure 1'. As such, when a user activates the shower enclosure water treatment mode, water assembly 40 outputs treated water from outlets 60 along each wall 28', which may clean or decrease the amount of bacteria, mold, viruses, and/or germs on walls 28', floor 34', and/or ceiling 30. Waterway 22' may include a plurality of water treatment devices 44 such that one water treatment device 44 is positioned adjacent each outlet 60, or alternatively, may be configured with one water treatment device 44 upstream of outlets 60. Water treatment device 44 may be remote from shower enclosure 1'.

Although the invention has been described in detail with reference to certain preferred embodiments, variations and modifications exist within the spirit and scope of the invention as described and defined in the following claims.

The invention claimed is:

1. A fluid delivery assembly for a shower comprising:
 a waterway assembly;
 a spray head configured to receive fluid from the waterway assembly and deliver fluid from an outlet;
 a water treatment assembly configured to provide a treatment to the fluid of the waterway assembly to decrease at least one of bacteria, mold, germs, and viruses within the spray head;
 a user input device configured to receive an input of a user to switch between a plurality of operating modes of the spray head, the operating modes of the spray head including a showering mode and a water treatment mode;
 a controller operably coupled to the user input device, the controller configured to control output of the treatment from the water treatment assembly according to the operating mode of the spray head in response to the user input device; and
 wherein the water treatment mode includes a spray head water treatment mode and a shower enclosure water treatment mode, the spray head water treatment mode permits the water treatment assembly to treat residual water left standing in the spray head after a previous use, the spray head treatment mode comprising a first concentration output of the treatment for a first time duration, the shower enclosure treatment mode comprising a second concentration output of the treatment for a second time duration, the first concentration output of the treatment being greater than the second concentration output of the treatment, and the first time duration being less than the second time duration.

2. The fluid delivery assembly of claim 1, wherein the water treatment assembly includes an indicating member configured to indicate the operating mode of the spray head.

3. The fluid delivery assembly of claim 1, wherein the controller controls the output of the treatment according to at least one of a concentration output of the treatment, a water temperature, and a time duration of the treatment.

4. The fluid delivery assembly of claim 3, wherein the controller is configured to prevent the output of the treatment when at least one of the treatment concentration, the water temperature, and the time duration is greater than a predetermined amount.

5. The fluid delivery assembly of claim 4, wherein the time duration of the treatment is between one second and ten minutes.

6. The fluid delivery assembly of claim 1, wherein the treatment is an ozone treatment.

7. The fluid delivery assembly of claim 1, wherein the short duration of the spray head water treatment mode comprises 1-10 seconds of application of the treatment.

\* \* \* \* \*